US011135663B2

(12) United States Patent
Spairani et al.

(10) Patent No.: US 11,135,663 B2
(45) Date of Patent: Oct. 5, 2021

(54) UNIT FOR BROACHING RULES OF DIE CUTTERS AND METHOD TO PERFORM THE BROACHING OF A RULE FOR DIE CUTTERS

(71) Applicant: Pro Form S.R.L., Caravaggio (IT)

(72) Inventors: Roberto Spairani, Caravaggio (IT); Secondo Spairani, Caravaggio (IT)

(73) Assignee: Pro Form S.R.L., Caravaggio (IT)

( * ) Notice: Subject to any disclaimer, the term of this patent is extended or adjusted under 35 U.S.C. 154(b) by 0 days.

(21) Appl. No.: 17/050,864

(22) PCT Filed: Apr. 16, 2019

(86) PCT No.: PCT/IB2019/053119
§ 371 (c)(1),
(2) Date: Oct. 27, 2020

(87) PCT Pub. No.: WO2019/229552
PCT Pub. Date: Dec. 5, 2019

(65) Prior Publication Data
US 2021/0229194 A1    Jul. 29, 2021

(30) Foreign Application Priority Data

Jun. 1, 2018    (IT) .................. 102018000005936

(51) Int. Cl.
*B23D 37/06*    (2006.01)
*B23D 41/04*    (2006.01)
(Continued)

(52) U.S. Cl.
CPC ............. *B23D 37/14* (2013.01); *B23D 37/06* (2013.01); *B23D 41/04* (2013.01); *B23D 41/06* (2013.01);
(Continued)

(58) Field of Classification Search
CPC ......... B23D 37/06; B23D 37/00–43/08; B23D 41/04; B23D 37/14; Y10T 409/404375;
(Continued)

(56) References Cited

U.S. PATENT DOCUMENTS 2,567,093 A * 9/1951 Agan .................... B23D 37/06
409/268
2,850,950 A * 9/1958 Poynter ................. B23D 37/06
409/272
(Continued)

FOREIGN PATENT DOCUMENTS

DE    102011102331 A1    11/2012
IT    102018000005936    6/2018
(Continued)

OTHER PUBLICATIONS

Machine Translation of JP 57-066813-A, which JP '813 was published Apr. 1982.*
(Continued)

*Primary Examiner* — Erica E Cadugan
(74) *Attorney, Agent, or Firm* — Conley Rose, P.C.; Rodney B. Carroll

(57) ABSTRACT

A broaching unit for rules of die cutters which comprises a supporting structure, for example a frame, a guide of a die cutter rule, and a tool-holding arm equipped with at least one broaching tool is described. The guide defines a sliding surface on which the rule is fed intermittently. The tool-holding arm is mounted on the supporting structure and is susceptible to reciprocating movements with respect to it and with respect to the guide, preferably forward and backwards movements along a transversal direction of the rule, just to intercept the die cutter rule with the broaching tool when the rule is stopped. Advantageously, the tool-holding arm is equipped with at least two broaching tools, for example four tools, and can be oriented with respect to
(Continued)

the guide, for example can rotate on itself, to selectively activate one of the broaching tools, i.e. to bring one of the tools into contact with the rule.

17 Claims, 7 Drawing Sheets

(51) Int. Cl.
*B23D 37/14* (2006.01)
*B23D 41/06* (2006.01)
*B23D 37/22* (2006.01)
*B23Q 39/00* (2006.01)

(52) U.S. Cl.
CPC ........ *B23D 37/22* (2013.01); *B23Q 2039/004* (2013.01); *B23Q 2220/002* (2013.01); *B23Q 2240/002* (2013.01); *B23Q 2240/007* (2013.01); *Y10T 409/400875* (2015.01); *Y10T 409/402275* (2015.01); *Y10T 409/404375* (2015.01)

(58) Field of Classification Search
CPC ......... Y10T 409/400875; Y10T 409/40–4077; Y10T 409/4077; Y10T 409/40385
USPC ................................................. 409/243–287
See application file for complete search history.

(56) References Cited

U.S. PATENT DOCUMENTS

| 5,295,937 A | * | 3/1994 | Katoh | ...................... B23D 7/06 |
| | | | | 483/28 |
| 6,098,258 A | | 8/2000 | Shimomura | |
| 7,882,720 B2 | | 2/2011 | Mizukawa et al. | |

FOREIGN PATENT DOCUMENTS

| JP | 57-066813 A | * | 4/1982 |
| WO | 9605951 A1 | | 2/1996 |
| WO | 2019229552 A1 | | 12/2019 |

OTHER PUBLICATIONS

Foreign Communication from Related Application—International Search Report and Written Opinion of the International Searching Authority, International Application No. PCT/IB2019/053119, dated Jul. 29, 2019, 10 pages.

* cited by examiner

Broaching Unit Including A Second Tool-Holding Arm Arranged On a Same Side of The Sliding Surface of the Guide As a Side of the Sliding Surface At Which the First Tool-Holding Arm is Located

Fig. 6

Broaching Unit In Which Each of First and Second Tool-Holding Arms Is Independently Reciprocatable Relative to the Supporting Structure Via Separate Actuators for Each Arm, And/Or Is Able to Be Independently Rotated Relative to Each Other With Respect to the Sliding Surface Via Independent Actuators

Fig. 7

UNIT FOR BROACHING RULES OF DIE CUTTERS AND METHOD TO PERFORM THE BROACHING OF A RULE FOR DIE CUTTERS

CROSS REFERENCE TO RELATED APPLICATIONS

This application is a filing under 35 U.S.C. 371 of International Application No. PCT/IB2019/053119, filed Apr. 16, 2019, entitled "Unit for broaching rules of die cutters and method to perform the broaching of a rule for die cutters," which claims priority to Italian Patent Application No. 102018000005936, filed Jun. 1, 2018, which applications are incorporated by reference herein in their entirety.

FIELD OF THE INVENTION

The present invention concerns a broaching unit, whose function is to remove material from the rules intended to be mounted on die cutters, and a method to perform the broaching of a rule for die cutters.

STATE OF THE ART

As known, a die cutter used in die cutting machines comprises a flat or cylindrical support generally made of plywood, in which metal rules equipped with a cutting and/or bending (creasing) profile are mounted; the rules are inserted by interference in corresponding seats obtained in the support and are prearranged so that to reproduce the shape of a product to be made by die cutting a sheet of paper or cardboard, for example a box. The seats in the support are generally obtained with laser cutting techniques. The insertion of the rules in the corresponding seats is usually carried out manually by an operator, often with the aid of a hammer.

The rules are obtained from metal strip which is unwound and machined, for example perforated, milled, rounded, bent several times to obtain the desired shapes, and finally cut to size.

For simplicity, reference will always be made to the rules hereinafter, even though the rules technically constitute the finished piece obtained from metal strip.

Structurally, the die cutter rule comprises a base insertable orthogonally into the support of a corresponding seat, and an edge facing the side opposite the support, i.e. towards the sheet to be die cut. On the support of the die cutter, further elements combined with the rules are also provided, for example elastic elements which facilitate the detachment and splitting of the die cut portion of the sheet from the die cutter itself.

The rules are mainly subdivided into cutting rules and bending or creasing rules.

The first type of rule has a cutting edge, typically with triangular section, able to cut the sheet when pushed into abutment against the latter, while die cutting. The cutting rules are used, for example, to make the cutting lines which define the perimetric development of a box.

The bending or creasing rules have a rounded edge shaped to press, without severing, the sheet against a seat of a counter-male die positioned on the opposite side with respect to the sheet to be die cut. This way, a trace is obtained along which the bending of the sheet is easy. This is the case, for example, with the creasing lines which are on the edges of a box.

Other rules allow the so-named weakening or tear-off lines to be made, i.e. dashed lines which alternate cut lengths with uncut lengths. For example, the Martin Miller firm is a manufacturer of die cutter rules.

Moreover, it is known to make, on the edge of the rule, recesses or grooves of small dimensions, named "nicks," which break up the cutting or creasing profile. Nicks are substantially grooves made by removing material from the edge of the rule. Nicks develop both in a longitudinal direction to break up the cutting edge, such as explained above, and for a given depth towards the base of the rule. At the nick, the sheet does not interact with the rule. Generally, the nicks are machined by punching. Some manufacturers of machines for manufacturing the rules have however preferred to adopt different techniques, such as, for example, by milling, grinding or electroeroding the nicks.

Another machining to which the rules of the die cutters are often subjected provides the relative thinning: material is locally removed from the sides of the metal strip used for the rules, to make the rules thinner in some lengths.

For example, U.S. Pat. No. 7,882,720 describes a plurality of cases in which it is necessary to thin the rules of a die cutter. The most representative example consists of the thinning of a length of a rule to obtain a seat for accommodating the end of a further rule in the die cutter, or to obtain nicks.

The localized thinning of the rules is generally obtained by milling, such as described in DE 102011102331, or by grinding or broaching. The geometry and depth of the thinning are not always the same, but vary depending on the applications. For example, the thinning can be rectangular, triangular, trapezoidal, deeper or less deep. From time to time, the machines used to thin must be adjusted and fine-tuned to obtain the desired geometry and depth.

Lately, broaching is preferred because it is fast and ensures high qualitative standards over time, but the machines available today are affected by some limitations.

Current machines are provided with a plurality of broaching units arranged in succession along the feeding direction of the strips being processed. Each broaching unit is provided with a single tool comprising a row of cutting teeth, which increasingly protrude so that when the tool moves on a side of a metal strip being processed, the teeth progressively remove material from the side of the strip.

The broaching units are equipped with different tools, one with respect to the other, so that when it is necessary to change the geometry of the thinning or of the nicks, a different broaching unit of the machine can be used to process the strips.

The layout of the machine is therefore bulky: if the die cutter rules must be made with different thinning of different shapes, the machine must necessarily be equipped with an adequate number of broaching units, and this makes the machine bulkier, heavier, more complex to be fine-tuned, manage and subject to maintenance.

U.S. Pat. No. 6,098,258 describes a broaching unit equipped with a tool-holding arm mounted on a supporting structure and susceptible to reciprocating movements with respect to it, to intercept the piece to be processed. The tool-holding arm is equipped with a circular and rotatable broaching tool provided with cutters having different characteristics.

WO 96/05951 describes a further solution according to the known art.

SUMMARY OF THE INVENTION

Object of the present invention is thus to provide a broaching unit for rules of die cutters that overcomes the limitations of the currently available solutions, being extremely versatile, but contemporaneously reliable, fast and compact.

A further object of the present invention is to provide a method to perform the broaching of die cutter rules which allows to simply and effectively overcome the limitations of traditional solutions.

In its first aspect, the present invention thus concerns the broaching unit according to claim 1.

In particular, the broaching unit comprises a supporting structure, for example a frame, a guide of a die cutter rule (i.e. of the strip which will become a die cutter rule), and a tool-holding arm equipped with at least one broaching tool. The guide defines a sliding surface on which the rule is fed intermittently. The tool-holding arm is mounted on the supporting structure and is susceptible to reciprocating movements with respect to it and with respect to the guide, thus with respect to the sliding surface, preferably forward and backwards movements along a transversal direction of the rule, just to intercept the die cutter rule with the broaching tool when the rule is stationary in the guide.

Advantageously, the tool-holding arm is equipped with at least two broaching tools, for example four tools, and can be oriented with respect to the guide, and thus with respect to the sliding surface, to selectively activate one of the broaching tools, i.e. to bring one of the tools into contact with the rule and to operate only that tool. When it is necessary to modify the broaching tool, there is no need to use a different broaching unit, as occurred in the past, as it is sufficient to activate another tool among those mounted on board of the tool-holding arm.

In practice, the broaching unit according to the present invention can be equipped with a plurality of broaching tools mounted on the tool-holding arm. The possibility to activate, from time to time, only one of the tools allows to avoid the installation of more broaching units in line on the same machine, along the feeding direction of the rule, all to the advantage of compactness.

In the preferred embodiment, the guide defines a sliding surface of the die cutter rule and the tool-holding arm extends along a skewed longitudinal axis with respect to this sliding surface. By alternatively moving the tool-holding arm in both directions along the longitudinal axis, the broaching is carried out on a side of the rule positioned in the guide.

Preferably, the tool-holding arm is rotatable on the relative longitudinal axis to direct, each time, a single broaching tool towards the sliding surface of the die cutter rule, and therefore towards a side of the die cutter rule. In other words, the tool-holding arm is susceptible to:
a) alternated movements along the relative longitudinal axis, to carry out the broaching of the die cutter rule, and
b) rotation movements on the relative longitudinal axis, to select which broaching tool to activate to perform a broaching.

The rotation referred to in point b) occurs between two positions: an initial position, corresponding to a first previously selected broaching tool, and a final position, corresponding to a second broaching tool selected for a new process. For example, if four tools were mounted on the tool-holding arm, the rotations would be of 90°; in case of eight tools, the rotations between two consecutive positions of the arm would be of 45°. Preferably, the tool-holding arm is lockable in an angular position corresponding to one of its activated broaching tools, for example with a mechanical or electromechanical brake.

Preferably, the broaching tools are interchangeable on the tool-holding arm, so that to be easily replaced when necessary.

In the preferred embodiment of the present invention, the broaching unit comprises at least two tool-holding arms arranged on opposite sides with respect to said sliding surface, to allow the machining of the two sides of the die cutter rule, or on the same side, to perform the broaching on the same side of the rule, at different points.

In this embodiment, each of the two tool-holding arms is movable alternately and/or directable, independently of the other tool-holding arms or jointly thereto. In other words, the arms can be synchronized with each other, or can move independently from one another.

Preferably, the guide of the rule is integral with the supporting structure and the tool-holding arms extend cantileverly from the supporting structure and slide with respect to it between an advanced, or distal, position and a retracted, or proximal position. One of the broaching tools intercepts the sliding surface of the die cutter rule between the advanced and retracted two positions, such as to perform the broaching.

Preferably, the tool-holding arms share a first actuator which imparts alternated movements thereto between the advanced and retracted positions. In alternative, the broaching unit comprises an independent actuator for each tool-holding arm.

More preferably, the first actuator comprises a worm screw rotatably mounted on the supporting structure, a motor activable to rotate the worm screw, and a carriage, or shuttle, engaging the worm screw and susceptible of moving along the worm screw in both directions, in response to the rotations imparted on the same worm screw in both directions. The tool-holding arms are fixed to the carriage and move therewith, in an integral way, along the screw. Clearly, the worm screw extends parallel to the longitudinal axis of the tool-holding arm, or of the tool-holding arms if more than one.

Preferably, the guide of the die cutter rule is integral with the supporting structure and the tool-holding arms extend cantileverly from the supporting structure and are each rotatable on their longitudinal axis to activate one tool at a time.

Preferably, the tool-holding arms share a second actuator, which imparts the rotations to the tool-holding arms on the relative longitudinal axis. In alternative, the broaching unit comprises an independent actuator to rotate each tool-holding arm.

More preferably, the second actuator comprises a pulley or a cogwheel coupled to each tool-holding arm, a motor and a drive belt or gearing chain functionally connecting the motor to the pulleys/cogwheels. The motor imparts intermittent rotations, to cause the rotation of the tool-holding arms between the initial and final positions, to activate the desired tool.

The preferred embodiment of the broaching unit comprises a tracer device (also called a thrust balancer device) for each tool-holding arm. The tracer device is preferably housed in the guide, and in turn comprises a foot movable between an active position, at which it abuts against the side of the die cutter rule located in the guide, on the opposite side with respect to the corresponding tool-holding arm, to counter the forces applied by a broaching tool, and an inactive position, at which the foot is slightly leaned on the rule, or is separated from it, and does not counterbalance the thrust exerted by a broaching tool (the rule can be fed). In practice, a tracer element comprising a foot which is pushed to abutment against the side of the rule opposite the side on which a tool is performing the broaching, corresponds to each tool-holding arm, to balance the thrust exerted by the tool and to prevent the rule from bending.

Preferably, the broaching unit comprises, for each tracer device, a corresponding actuator, for example a linear guide that extends to push the foot to the relative active position and retracts to allow the return of the foot to the relative inactive position, possibly with the intervention of a countering elastic element. The actuator of the foot is synchronized with the first actuator of the tool-holding arms.

A second aspect of the present invention concerns a method to perform the broaching of a die cutter rule, comprising:
  feeding a rule intermittently on a sliding surface, for example a surface defined by a guide;
  moving a tool-holding arm alternately forward and backwards along a direction transversal to the feed direction of the rule, for example along the longitudinal axis of the arm itself, wherein the tool-holding arm is provided with two or more broaching tools selectively activable; and
  directing the tool-holding arm with respect to the sliding surface to actuate one of the broaching tools so as to make it face the rule on the sliding surface.

The advantages of this method are the same ones as those described in relation to the broaching unit, mainly simplicity of execution, compactness and versatility of the unit implementing the method.

The method according to the present invention can be implemented by using the broaching unit described above.

BRIEF DESCRIPTION OF THE DRAWINGS

Further characteristics and advantages of the invention will be better highlighted by the review of the following detailed description of a preferred, but not exclusive, embodiment illustrated by way of example and without limitations, with the aid of the accompanying drawings, in which:

FIG. 6 is a schematic representation of a further embodiment of the broaching unit; and FIG. 7 is a schematic representation of a further embodiment of the broaching unit.

DETAILED DESCRIPTION OF THE INVENTION

Figure 1:
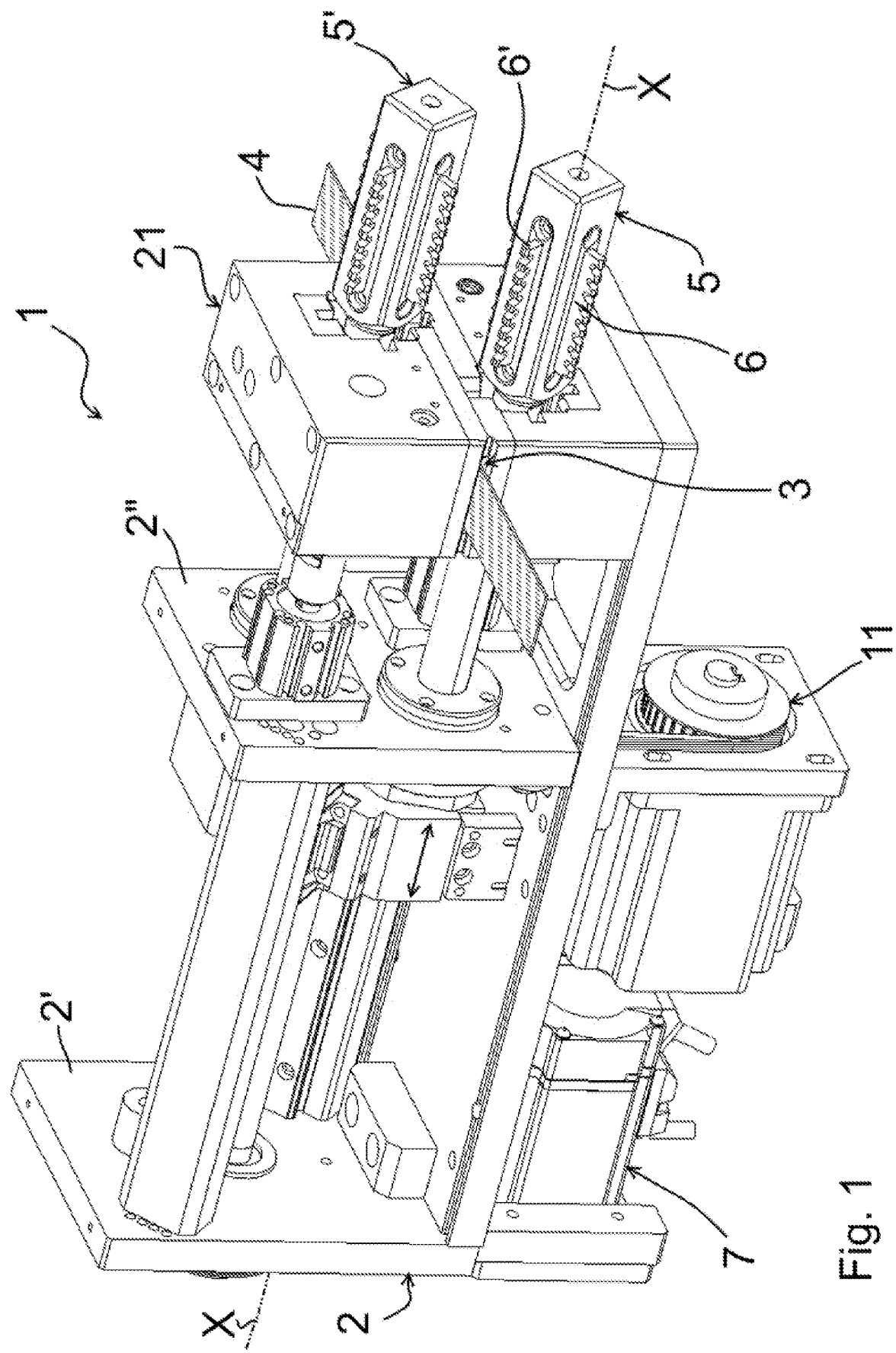
FIG. 1 is a perspective front view of a broaching unit according to the present invention.

FIGS. 1-5 show the preferred embodiment of the broaching unit 1 according to the present invention, intended to be mounted on a machine for processing metal strips intended to be transformed into rules 4 for die cutters. The unit 1 comprises a supporting structure 2, in practice a metal frame or a metal framework, whose task is to support the components of the unit 1.

One of the components is a guide 3 which defines a sliding surface for a die cutter rule 4. The guide 3 thus defines the path along which the rule 4 is intermittently fed, to allow the other components of the unit to perform the broaching. As can be noted in the figures, in the example shown, the sliding surface is horizontal and thus the rule 4 is oriented with a side facing above, the upper side, and a side facing below, the lower side.

The means intended for feeding the rule 4 in the guide 3 can be means of the broaching unit 1, for example opposite wheels which rotate on the two sides of the rule 4, or can be means outside of the unit 1, such as in the example shown in the figures.

The supporting structure 2 comprises two vertical sides 2' and 2" and at least one tool-holding arm 5, preferably two tool-holding arms 5 and 5', as shown in the figures. In general, however, there can also be more than two tool-holding arms, depending on the necessity.

The tool-holding arms 5 and 5' are mounted on the supporting structure 2 and extend cantileverly from the side 2". The reference X-X denotes the longitudinal axis of the arm 5: the arms 5 and 5' can be translated on the relative longitudinal axis X-X in both directions, in response to the thrusts imparted by a first actuator 7 which will now be described with particular reference to FIG. 2. Preferably, the arms 5, 5' are supported on the side 2" of the supporting structure 2 and on the guide 3 by means of bearings or bearing brasses.

The first actuator 7 comprises a first electric motor 9 constrained to the supporting structure 2 and equipped with a pulley 18 coupled to the shaft of the motor 9 itself. The pulley 18 in turn actuates another pulley 19 by means of a belt 20. The pulley 19 rotates a worm screw 8 along which a carriage, or shuttle, 10 is positioned. The carriage 10 engages the worm screw 8 and, in response to the clockwise and counterclockwise rotations of the screw 8, moves towards the side 2" of the supporting structure or away therefrom. The tool-holding arms 5 and 5' are translated integrally with the carriage 10, which thus controls the forward and backwards movements along the respective longitudinal axes X-X.

The first actuator 9 is in common with the two tool-holding arms 5, 5', i.e. it is shared: the translations of the two arms 5, 5' occur synchronously. However, it is possible to achieve a broaching unit 1 with an actuator for each arm 5, 5', so that to make them completely independent, as schematically depicted in FIG. 7.

The arms 5 and 5' are each provided with at least two broaching units 6, 6'. In the example shown in the figures, the arms 5, 5' each comprise four broaching tools 6, 6', 6", 6'". Only one of the tools 6-6'" is active at a given time and interacts with the rule 4 in the guide 3, during the forth and back runs of the relative arm 5, 5', and removes material from the rule 4.

More in detail, the broaching tools 6-6'" are arranged on the end of the tool-holding arms 5, 5' angularly staggered. In the example shown in the figures, the angular staggering is of 90°, but can generally be different, depending on the necessity and number of broaching tools present. Preferably, the tools 6-6'" are interchangeable, i.e. can be easily separated from the relative arm 5, 5' to be replaced with another tool.

Figure 2:
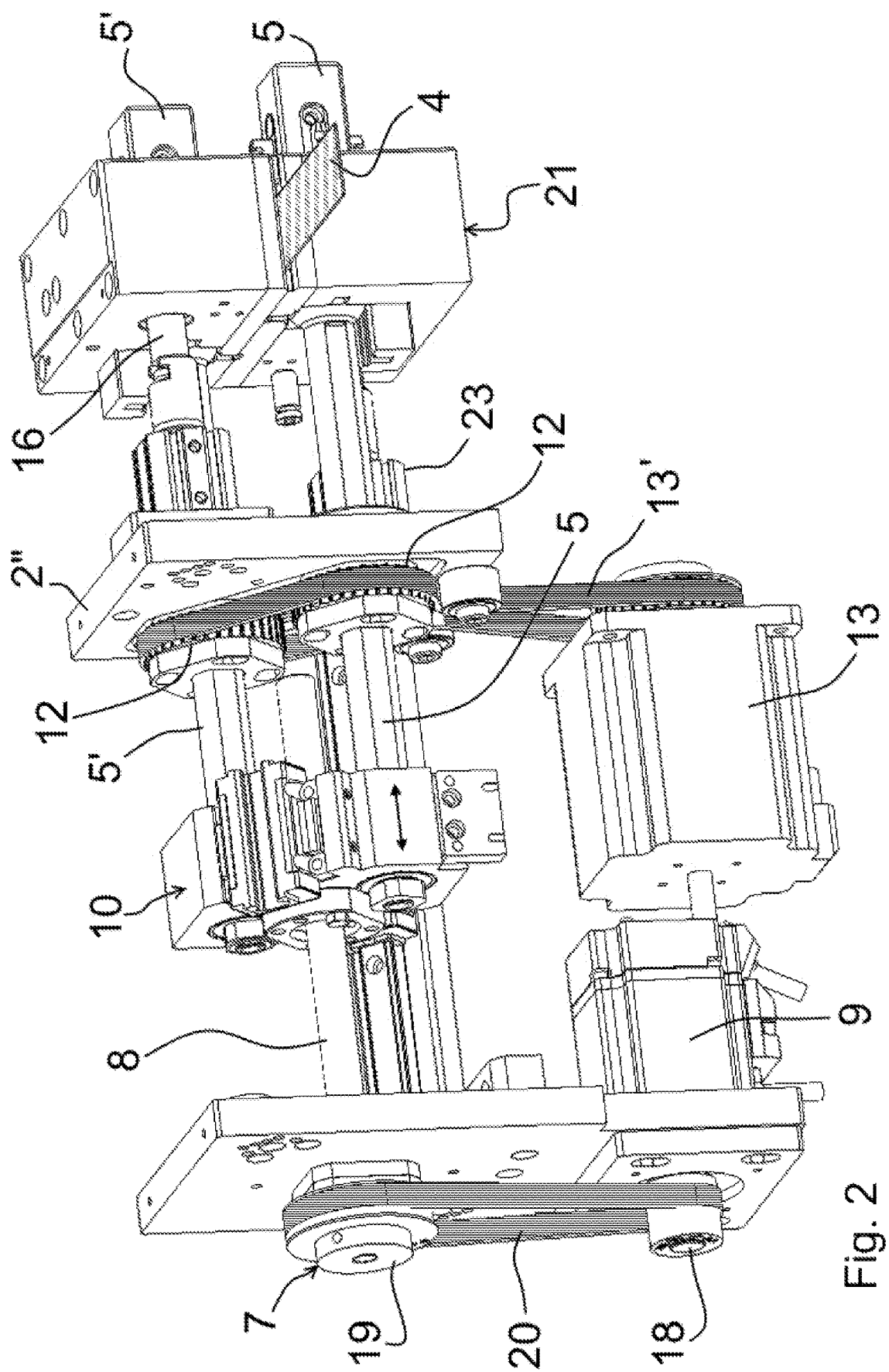
FIG. 2 is a perspective back view of the broaching unit shown in FIG. 1, with some parts not shown for greater clarity.
Figure 3:
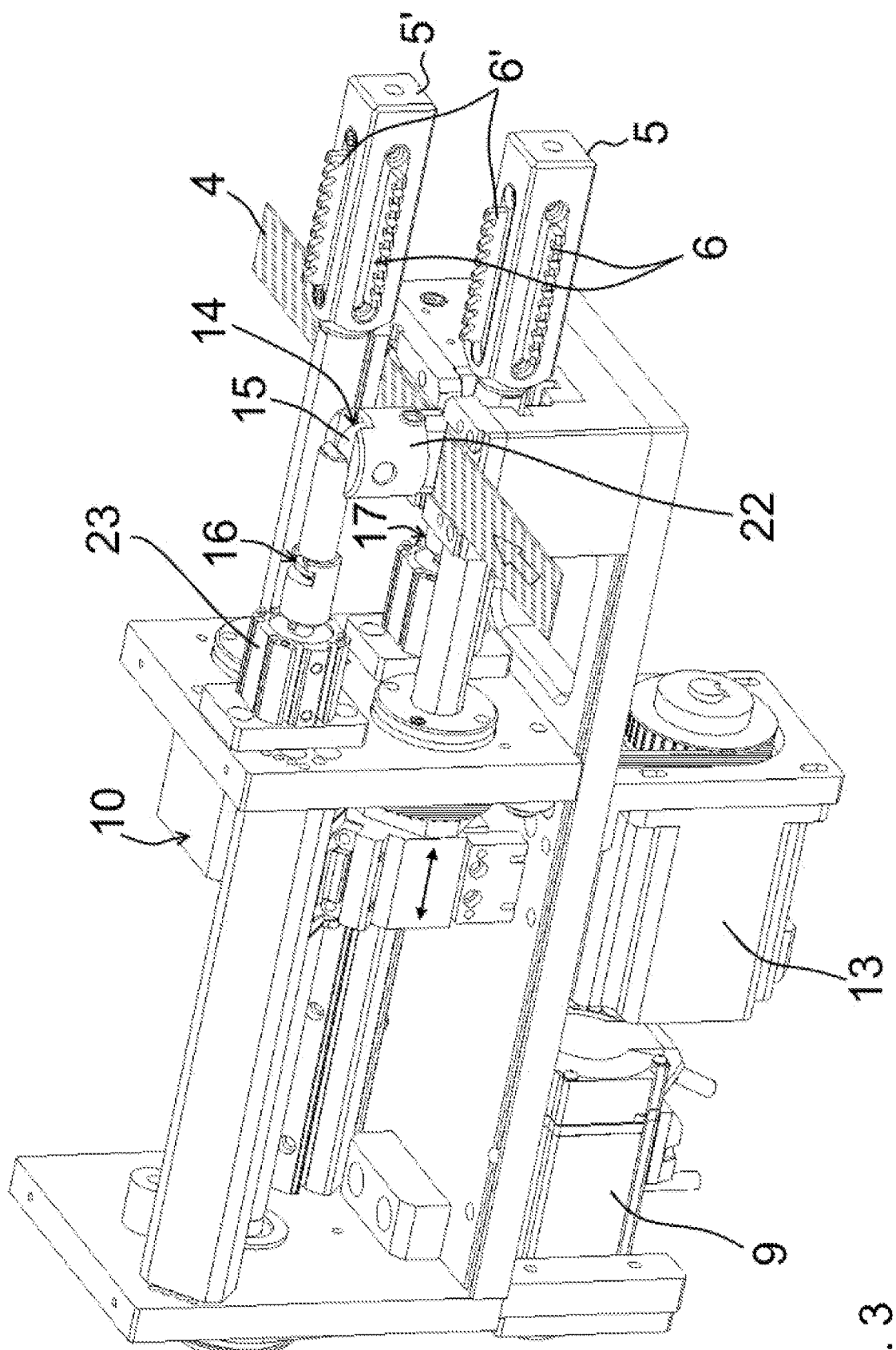
FIG. 3 is a perspective front view of the broaching unit shown in FIG. 1, partially disassembled and in a first configuration.
Figure 4:
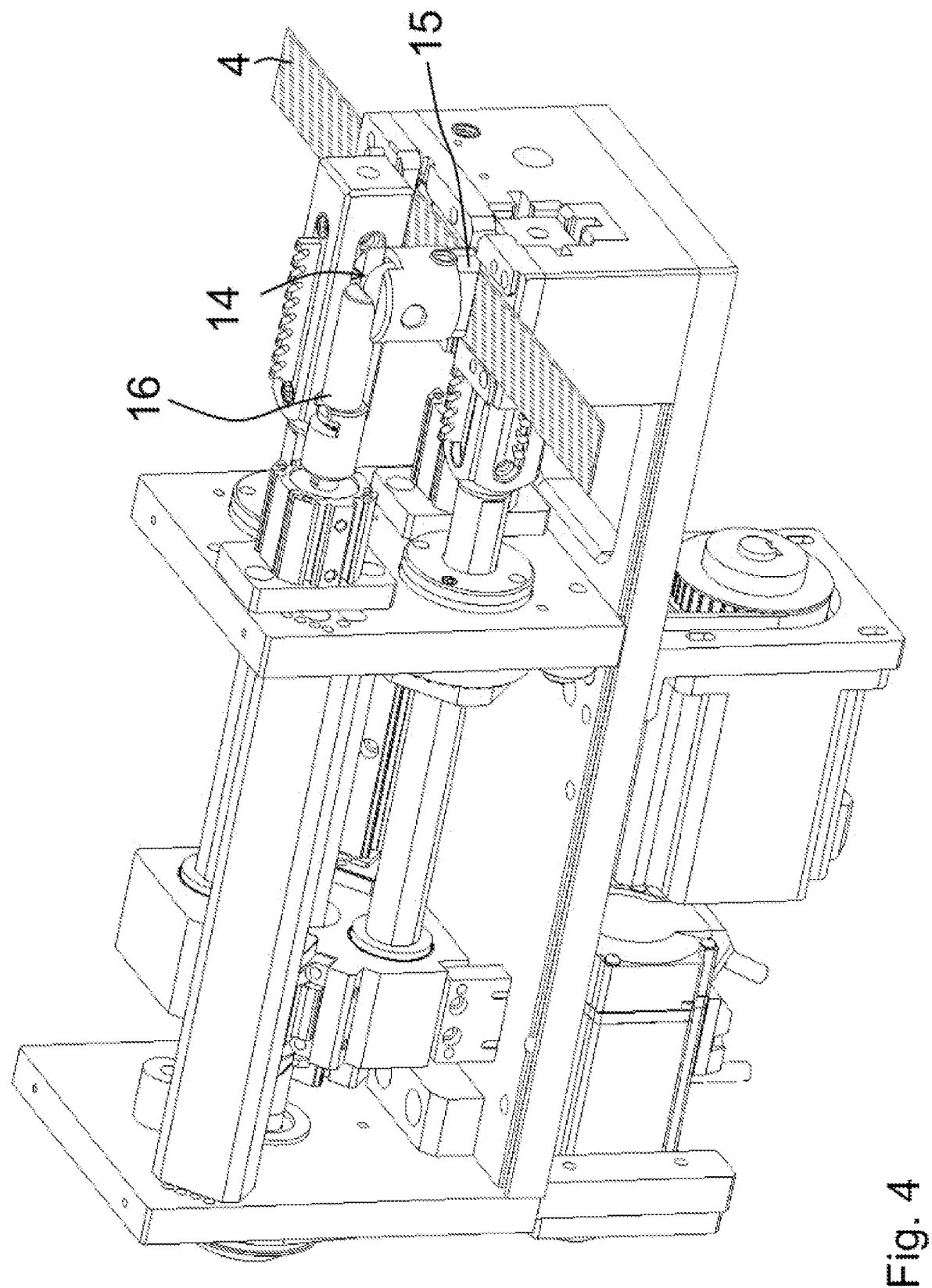
FIG. 4 is a perspective front view of the broaching unit shown in FIG. 1, partially disassembled and in a second configuration.
Figure 5:
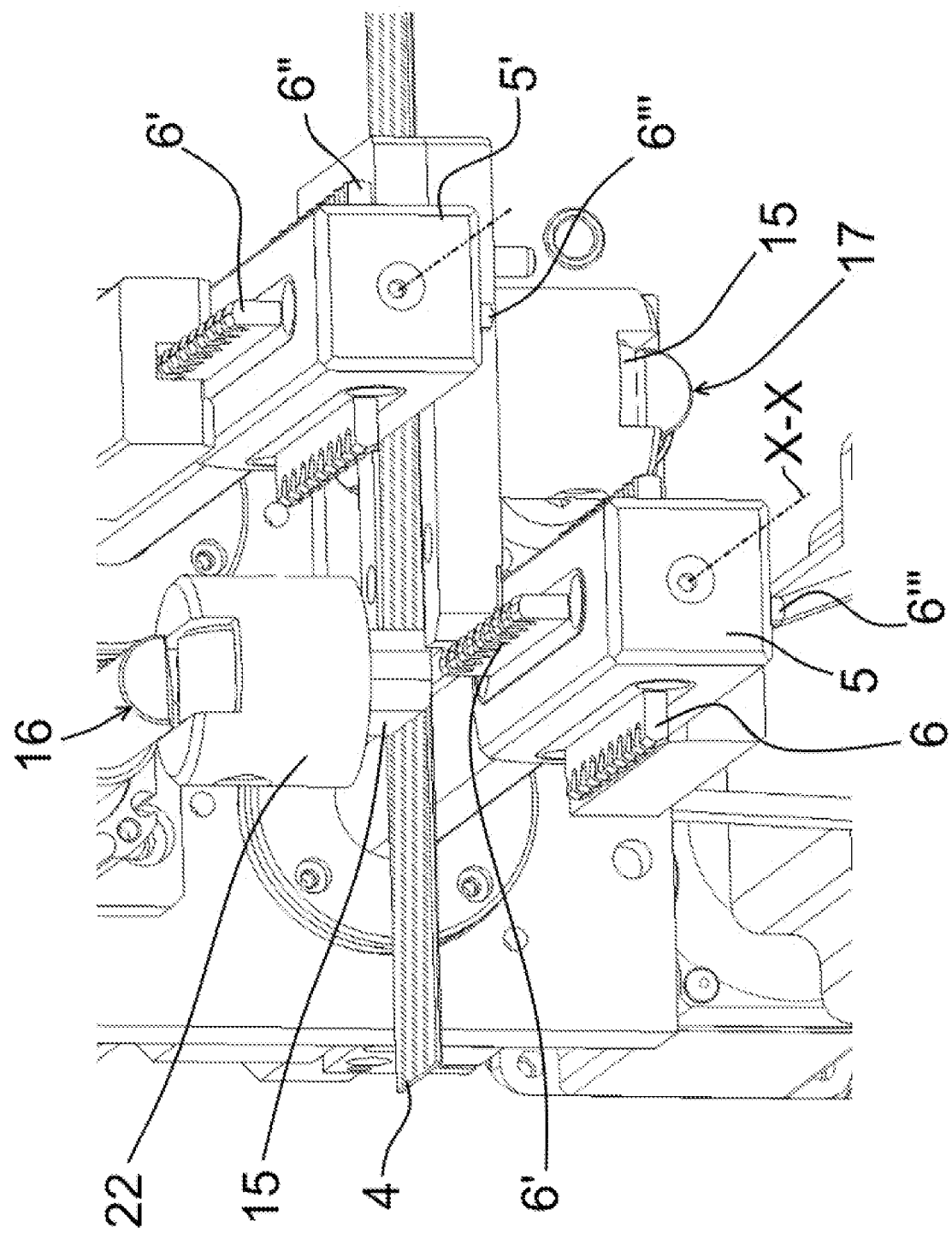
FIG. 5 is a perspective and enlarged view of a portion of the broaching unit shown in FIG. 1.

With particular reference to FIGS. 1-2, the unit 1 comprises a second actuator 11 whose task is to rotate the tool-holding arms 5, 5' to change the tool 6-6''' which must perform the broaching. The second actuator 11 comprises a second electric motor 13 equipped with a pulley. A belt 13' transmits the rotations to two pulleys 12', one for each tool-holding arm 5, 5'. The pulleys 12 each rotate on the corresponding axis X-X but do not move axially with respect to the side 2'' of the supporting structure 2: the arms 5 and 5' are in fact slidable inside the respective pulleys 12 (FIG. 2). For example, in the position shown in the figures, the arm 5 engages the lower side of the rule 4 with the tool 6' and the arm 5' engages the upper side of the rule 4 with the tool 6'''.

Therefore, when the first actuator 7 is operating, the second actuator 11 is stopped, and the arms 5, 5' translate forward and backwards but do not rotate on the axis X-X. When the second actuator 11 is operating, the first actuator is stopped, and the arms 5, 5' rotate to change the tool 6-6''' which must engage the rule 4, but do not translate forward and backwards along the axis X-X.

Thus, advantageously, when it is necessary to change the tool 6-6''' to perform the broaching of the rule 4, for example when it is necessary to use a tool of a different shape, it is sufficient to stop the first actuator 7 and to activate the second actuator 11 until the arms 5, 5' rotate by the angle necessary to bring the desired tool 6-6''' in front of the rule 4. Thus the rotation of the arms 5, 5' is locked, for example with a braking device (not shown) or with the same motor 13, and the first actuator 7 is reactivated to perform the broaching.

The second actuator 11 is in common with the two tool-holding arms 5, 5', i.e. it is shared: the translations of the two arms 5, 5' occur in opposite direction. However, it is possible to achieve a broaching unit 1 with an actuator for each arm 5, 5', so that to make them completely independent, as schematically depicted in FIG. 7.

In the example shown in the figures, the guide 3 is defined in a box-like structure 21, which also houses other components of the unit 1, as will now be described, and through which the arms 5, 5' slide. In particular, the box-like structure 21 is shown complete in FIGS. 1-2, and is instead partially disassembled in the remaining FIGS. 3-5 in order to show the other components.

In addition to the guide 3, the box-like structure 21 houses a tracer device 14 for each tool-holding arm 5, 5'. The tracer device 14 comprises a foot 15 movable between:
an active position, at which it abuts on the corresponding side of the rule, the upper one or the lower one, depending on the case, from the opposite side with respect to the corresponding tool-holding arm 5, 5'; and
an inactive position, at which the foot 15 is leaned on the rule 4 without exerting a thrust, or is separated from the die cutter rule 4, i.e. is raised with respect to it and does not interact with the rule 4.

In practice, the foot 15 balances the pressure exerted by the broaching tool 6-6''' when it removes material from the rule 4, during the longitudinal movement of the arms 5, 5'. This circumstance is well shown in FIG. 5: the foot 15 is in abutment against the upper side of the rule 4, waiting for the tool 6' of the arm 5 to perform the broaching.

Each of the two tracer devices 14 is actuated by a corresponding actuator 16 or 17: in the example shown, it is a linear guide that extends from the side 2'' of the supporting structure 2 to push the foot 15 to the relative active position, and retracts towards the side 2'' to allow the return of the foot 15 to the relative inactive position, if necessary thanks to the intervention of a countering elastic element.

In particular, the foot 15 slides in a bushing 22 housed in the box-like structure 21, along a direction orthogonal to the feed direction of the rule 4 in the guide 3. The upper part of the foot 15 is rounded and the actuator 16, 17 is in practice a finger with a beveled surface which causes the displacement in the bushing 22, towards the rule 4, by pushing on the foot 15. The backwards movement of the actuator 16, 17 allows the foot 15 to return to the inactive position. For this reason, the actuator 16, 17 is equipped with its own motor 23, possibly assisted by an elastic element such as a spring.

The operations of the unit 1 also describes the method according to the present invention, which provides for the intermittent feeding of a rule 4 on a sliding surface, such as the surface defined by the guide 3, and for the reciprocating forward and backwards movement of the tool-holding arm 5 along a direction transversal to the feed direction of the rule 4. The tool-holding arm 5 is provided with at least two selectively activable broaching tools 6-6'''. By directing the tool-holding arm 5 with respect to the sliding surface, as a result one of the broaching tools 6-6''' faces the rule 4 on the sliding surface.

The invention claimed is:

1. A unit (1) for broaching a strip for a rule for a die cutter, the unit (1) comprising:
   a supporting structure (2),
   a guide (3) defining an elongated sliding surface having a longitudinal axis, on which sliding surface the strip for the die cutter rule (4) slides as the strip moves through the unit (1) in the direction of a longitudinal axis of the strip and in a direction of the longitudinal axis of the sliding surface; and
   a first tool-holding arm (5) equipped with at least two broaching tools (6-6'''),
   wherein the first tool-holding arm (5) is mounted on the supporting structure (2) and is reciprocatable, with respect to the supporting structure (2) and with respect to the sliding surface, in a direction that is transverse with respect to the longitudinal axis of the sliding surface, so as to broach the strip for the die cutter rule (4) with a selected one of the broaching tools (6-6''),
   wherein the first tool-holding arm (5) is equipped with the at least two broaching tools (6-6''') and can be adjustably oriented with respect to the sliding surface to enable the selected one of the broaching tools (6-6') to be selectively actuated to perform the broaching of the strip via the selected one of the broaching tools moving in the transverse direction.

2. Broaching unit (1) according to claim 1, wherein the first tool-holding arm (5) has a longitudinal axis (X-X) that extends in a direction that is skewed with respect to said longitudinal axis of said sliding surface.

3. Broaching unit (1) according to claim 2, wherein the first tool-holding arm (5) is rotatable about said longitudinal axis (X-X) of said first tool-holding arm to direct a single one of the broaching tools (6-6''') towards the sliding surface of the guide (3), and therefore towards a side of the strip for the die cutter rule (4).

4. Broaching unit (1) according to claim 3, wherein the first tool-holding arm (5) is lockable in an angular position corresponding to a position at which one of the broaching tools (6-6''') faces towards the sliding surface of the guide (3).

5. Broaching unit (1) according to claim 1, wherein the broaching tools (6-6''') are interchangeable on the first tool-holding arm (5).

6. Broaching unit (1) according to claim 1, comprising at least two a second tool-holding arm (5') equipped with at least two broaching tools, the second tool-holding arm arranged on an opposite side of said sliding surface from a side of the sliding surface at which the first tool-holding arm is located, to allow the machining of the two sides of the strip of the die cutter rule (4).

7. Broaching unit (1) according to claim 6, wherein each of the first and the second tool-holding arms (5, 5') is reciprocatable relative to the supporting structure independently of each other and/or is able to be independently oriented relative to each other with respect to the sliding surface.

8. Broaching unit (1) according to claim 6, wherein each of the first and the second tool-holding arms (5, 5') is jointly reciprocatable relative to the supporting structure and/or is able to be synchronously oriented with respect to the sliding surface.

9. Broaching unit (1) according to claim 1,
comprising a second tool-holding arm (5') equipped with at least two broaching tools;
wherein the guide (3) is integral with the supporting structure (2), and
wherein the tool-holding arms (5, 5') extend cantileverly from the supporting structure (2) and slide with respect to the supporting structure (2) between an advanced position in which the tool-holding arms are more distal from the supporting structure (2) and a retracted position in which the tool-holding arms are more proximal to the supporting structure (2), and
wherein one of the broaching tools (6-6''') machines the strip for the die cutter rule (4) when the tool-holding arms are moved between the advanced and retracted positions.

10. Broaching unit (1) according to claim 9, comprising a first actuator (7) shared among the tool-holding arms (5, 5'), which imparts alternated movements to the tool-holding arms (5, 5') for moving the tool-holding arms between the advanced and retracted positions or, alternatively, the broaching unit (1) comprises an independent actuator for each tool-holding arm (5, 5') for independently moving the tool-holding arms between the advanced and retracted positions.

11. Broaching unit (1) according to claim 9, comprising a first actuator (7) shared among the tool-holding arms (5, 5'), which imparts alternated movements to the tool-holding arms (5, 5') for moving the tool-holding arms between the advanced and retracted positions, and
wherein said first actuator (7) comprises: a worm screw (8) rotatably mounted on the supporting structure (2); a motor (9) activatable to rotate the worm screw (8); and a carriage (10), engaging the worm screw (8) and capable of moving along the worm screw (8) in two opposite directions, in response to rotations imparted by the motor to the worm screw (8) in two opposite directions, and
wherein the tool-holding arms (5, 5') are translationally integral with the carriage (10) so as to move translationally with the carriage (10).

12. Broaching unit (1) according to claim 1,
comprising a second tool-holding arm (5') equipped with at least two broaching tools;
wherein the guide (3) is integral with the supporting structure (2) and the tool-holding arms (5, 5') extend cantileverly from the supporting structure (2) and are each rotatable about their own longitudinal axis (X-X).

13. Broaching unit (1) according to claim 12, comprising an actuator (11) shared among the tool-holding arms (5, 5'), which actuator imparts the rotations to the tool-holding arms (5, 5') about the respective longitudinal axis (X-X) thereof or, alternatively, the broaching unit (1) comprises an independent actuator for each tool-holding arm (5, 5'), which independent actuators each rotate a respective one of the tool-holding arms about their respective longitudinal axis.

14. Broaching unit (1) according to claim 12,
comprising an actuator (11) shared among the tool-holding arms (5, 5'), which actuator imparts the rotations to the tool-holding arms (5, 5') about the respective longitudinal axis (X-X) thereof;
wherein said actuator (11) comprises:
a respective pulley or a respective cogwheel (12) coupled to each of the tool-holding arms (5, 5');
a motor (13); and
a drive belt or gearing chain (13') connected to the motor (13) and to the pulleys or cog wheels (12), respectively; and
wherein said motor imparts intermittent rotations.

15. Broaching unit (1) according to claim 1,
comprising, for the tool-holding arm (5, 5'), a thrust balancer device (14) housed in the guide (3), and
the thrust balancer device (14) comprising a foot (15) movable between an active position and an inactive position,
wherein when the foot (15) is at the active position, the foot (15) abuts against the strip for the die cutter rule (4) while the strip is located in the guide (3), which abutting occurs on a side of the strip that is an opposite side with respect to a side of the strip at which the tool-holding arm (5, 5') is located, such that the foot (15) counters the forces applied by one of the broaching tools (6-6''') to the strip for the broaching rule (4), and
wherein when the foot (15) is at the inactive position, the foot (15) is either:
(i) leaned on the strip for the die cutter rule (4) and does not counterbalance the one of the broaching tools, or
(ii) is separated from the strip for the die cutter rule (4) and does not counterbalance the one of the broaching tools.

16. Broaching unit (1) according to claim 15, comprising, for the thrust balancer device (14), a corresponding actuator (16, 17), which actuator comprises a linear guide that extends to push the foot (15) to the active position and retracts to allow the return of the foot (15) to the inactive position.

17. Broaching unit (1) according to claim 1, comprising a second tool-holding arm (5') equipped with at least two broaching tools, the second tool-holding arm arranged on a same side of said sliding surface as a side of the sliding surface at which the first tool-holding arm is located.

* * * * *